(12) United States Patent
Yamasaki et al.

(10) Patent No.: US 11,407,464 B2
(45) Date of Patent: Aug. 9, 2022

(54) FRONT STRUCTURE OF SADDLE RIDING VEHICLE

(71) Applicant: HONDA MOTOR CO., LTD., Tokyo (JP)

(72) Inventors: Shota Yamasaki, Wako (JP); Toru Sakai, Wako (JP); Keita Mikura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 343 days.

(21) Appl. No.: 16/788,544

(22) Filed: Feb. 12, 2020

(65) Prior Publication Data

US 2020/0290694 A1  Sep. 17, 2020

(30) Foreign Application Priority Data

Mar. 14, 2019  (JP) ............................ JP2019-047538

(51) Int. Cl.
*B62J 6/026* (2020.01)
*B62K 21/02* (2006.01)
*B62J 6/027* (2020.01)

(52) U.S. Cl.
CPC .............. *B62J 6/026* (2020.02); *B62J 6/027* (2020.02); *B62K 21/02* (2013.01)

(58) Field of Classification Search
CPC .. B62J 6/026; B62J 6/027; F21S 41/19; F21S 41/255; F21S 41/29
See application file for complete search history.

(56) References Cited

U.S. PATENT DOCUMENTS

| | | | | |
|---|---|---|---|---|
| 4,356,536 A | * | 10/1982 | Funabashi | B62J 6/025 362/306 |
| 4,461,508 A | * | 7/1984 | Ogishima | B62J 17/02 296/78.1 |
| 4,709,774 A | * | 12/1987 | Saito | B62J 17/02 180/68.1 |
| 6,203,093 B1 | * | 3/2001 | Suzuki | B62J 17/00 296/78.1 |
| 2001/0046140 A1 | * | 11/2001 | Chase | F21S 41/50 362/549 |
| 2006/0239021 A1 | * | 10/2006 | Inaba | F21S 43/50 362/538 |
| 2013/0100689 A1 | * | 4/2013 | Ohashi | B62J 37/00 362/476 |
| 2014/0063826 A1 | * | 3/2014 | Noguchi | B62J 17/02 362/476 |
| 2014/0177200 A1 | * | 6/2014 | Tsukui | B62J 17/10 362/37 |

FOREIGN PATENT DOCUMENTS

| | | | | |
|---|---|---|---|---|
| JP | H 10-71980 | * | 3/1998 | ............. B62J 17/02 |
| JP | 2010-202129 | | 9/2010 | |

* cited by examiner

*Primary Examiner* — Zheng Song
(74) *Attorney, Agent, or Firm* — Rankin, Hill & Clark LLP

(57) ABSTRACT

A motorcycle includes, in a body front portion: a headlight that includes a headlight case and a lens coupled to a front end of the headlight case; and a headlight cowl that covers a periphery of the headlight. The lens includes a cylindrically-shaped peripheral wall portion coupled to the headlight case. A cylindrically-shaped cover member gradually decreasing in diameter toward the rear of the vehicle is placed between the headlight and the headlight cowl. The cover member covers at least the outside of the peripheral wall portion of the lens.

6 Claims, 13 Drawing Sheets

FRONT STRUCTURE OF SADDLE RIDING VEHICLE

INCORPORATION BY REFERENCE

The present application claims priority under 35 U.S.C. § 119 to Japanese Patent Application No. 2019-047538 filed on Mar. 14, 2019. The content of the application is incorporated herein by reference in its entirety.

TECHNICAL FIELD

The present invention relates to a front structure of a saddle riding vehicle.

BACKGROUND ART

A light leakage prevention structure is conventionally known which is mounted in a housing or a lens of a headlight in order to block light leaking from the vicinity of an opening of a cowling to the inside of the cowling with the lens of the headlight exposed to the outside through the opening formed in the cowling (see, e.g., Patent Literature 1).

CITATION LIST

Patent Literature

[Patent Literature 1] JP-A No. 2010-202129

SUMMARY OF INVENTION

Technical Problem

In the Patent Literature 1, as a light leakage prevention structure, an extending portion which extends toward the inner face of the cowling, and a rib which is bent from a distal end of the extending portion to extend along the inner face of the cowling are formed in a junction of the housing with the lens, and otherwise, the extending portion and the rib as described above are formed within the cowling in the lens. Because of this, the housing and the lens have complicated shapes and thus are not easily formable.

It is an object of the present invention to provide a front structure of a saddle riding vehicle which is a simple structure but is capable of preventing light from leaking toward the rear of the vehicle.

Solution to Problem

A front structure of a saddle riding vehicle includes, in a body front portion: a headlight (45) that includes a headlight case (61) and a lens (62) coupled to a front end of the headlight case (61); and a headlight cowl (47) that covers a periphery of the headlight (45). The lens (62) includes a peripheral wall portion (62a) that is formed in a cylindrical shape and that is coupled to the headlight case (61). A cover member (64) of a cylindrical shape is arranged between the headlight (45) and the headlight cowl (47), the cover member (64) gradually decreasing in diameter toward rear of the vehicle. The cover member (64) covers at least the outside of the peripheral wall portion (62a) of the lens (62).

In the above configuration, the cover member (64) may be attached to the headlight (45), and the cover member (64) may have a front end abutting on a cushion member (66) mounted on an inner face of the headlight cowl (47).

Also, in the above configuration, the headlight case (61) may have a peripheral wall portion (61a) in which a plurality of countersinks (61e) is formed. The cover member (64) may have a plurality of tube portions (64h, 64m) that protrudes toward an inside from an inner face and that is formed to be respectively fitted into the plurality of countersinks (61e). A fastener member (82) may be inserted through each of the plurality of tube portions (64h, 64m) and then passes through the headlight case (61) to be fastened to a housing (81) placed inside the headlight case (61).

Also, in the above configuration, the headlight cowl (47) may include an opening (48a) which exposes a front face of the lens (62). The opening (48a) may be formed smaller than a perimeter edge of the headlight case (61), and an edge portion (48f) of the opening (48a) may overlap a perimeter edge (61d) of the headlight case (61) as seen in the front view of the vehicle. The cover member (64) may include a step portion (64e) from a front end toward the rear, the step portion (64e) being inclined upwardly toward the rear.

Also, in the above configuration, the headlight cowl (47) may be supported by a headlight cowl stay (72) including an upper attachment portion (77) and a lower attachment portion (76). The upper attachment portion (77) may be co-clamped together with a blinker stay (59) supporting a front blinker (46), and the lower attachment portion (76) may be co-clamped together with a headlight stay (71) supporting the headlight (45).

Also, in the above configuration, left and right sides of an upper end portion of a front fork (12) supporting a front wheel (2) may be coupled through a top bridge (54), a cowl stay support member (84) supporting the headlight cowl stay (72) may be attached to the top bridge (54), and the cowl stay support member (84) may be co-clamped together with the upper attachment portion (77) and the blinker stay (59).

Advantageous Effects of Invention

In the front structure of the saddle riding vehicle, the lens includes the cylindrically-shaped peripheral wall portion coupled to the headlight case. And, the cylindrically-shaped cover member, which gradually decreases in diameter toward the rear of the vehicle, is placed between the headlight and the headlight cowl. The cover member covers at least the outside of the peripheral wall portion of the lens. Therefore, since the peripheral wall portion of the lens is covered with the cylindrically-shaped cover member gradually decreasing in diameter toward the rear of the vehicle, the simple structure enables the blocking of the light illuminated from the peripheral wall portion of the lens, and thus the prevention of the light from leaking toward the rear of the vehicle.

In the above configuration, the cover member is attached to the headlight, and the front end of the cover member abuts on the cushion member mounted on the inner face of the headlight cowl. Therefore, since the leakage of light is prevented by the separate cover member, the shape is not complicated as done where the leakage of light is prevented by use of the headlight case and the headlight cowl. Thus, the cover member can be readily attached, and this provides enhanced working efficiency. Further, the leakage of light from between the headlight cowl and the cover member can be prevented.

Also, in the above configuration, the plurality of countersinks is formed in the peripheral wall portion of the headlight case, and the plurality of tube portions protruding inward from the inner face is formed on the cover member to be respectively fitted into the countersinks. And, the fastener members inserted through the tube portions pass through the headlight case to be fastened to the housing placed inside the headlight case. Therefore, since temporary assembly can be performed by fitting the tube portions of the cover member into the countersinks, the assembly working efficiency can be enhanced. Further, a fastening portion of the headlight case and the housing can be utilized to co-clamp the cover member to the headlight case, so that there is no need to provide an additional attachment portion in the cover member.

Also, in the above configuration, the headlight cowl includes the opening in which the front face of the lens is exposed. The opening is formed smaller than the perimeter edge of the headlight case and the edge portion of the opening overlaps the perimeter edge of the headlight case as seen in the front view of the vehicle. And, the cover member includes the step portion inclined upwardly from the front end toward the rear. As a result, it is possible to enhance the stability in handling which depend on the effect of guiding air in the space between the headlight and the cover member.

Also, in the above configuration, the headlight cowl is supported by the headlight cowl stay. The headlight cowl stay includes the upper attachment portion and the lower attachment portion. The upper attachment portion is co-clamped together with the blinker stay supporting the front blinker, and the lower attachment portion is co-clamped together with the headlight stay supporting the headlight. Thus, by separately co-clamping the upper attachment portion and the lower attachment portion, a reduction in component count and suppression of the resonance in the headlight cowl can be achieved.

Also, in the above configuration, the left and right of the upper end portion of the front fork supporting the front wheel are coupled together by the top bridge. The cowl stay support member supporting the headlight cowl stay is attached to the top bridge. The cowl stay support member is co-clamped together with the upper attachment portion and the blinker stay. Therefore, the headlight cowl stay is firmly supported by the cowl stay support member, and also the co-clamped portion of the upper attachment portion and the blinker stay can be utilized to support the headlight cowl stay. This enables a reduction in component count.

DESCRIPTION OF EMBODIMENTS

Embodiments according to the present invention will now be described with reference to the accompanying drawings. It is noted that, throughout the description, words for directions such as front, rear, left, right, upward and downward are used in conformity with directions with respect to the vehicle body unless otherwise stated. Also, in each drawing, a reference sign FR denotes the front of the vehicle body, a reference sign UP denotes the upper side of the vehicle body and a reference sign LH denotes the left of the vehicle body.

Figure 1:
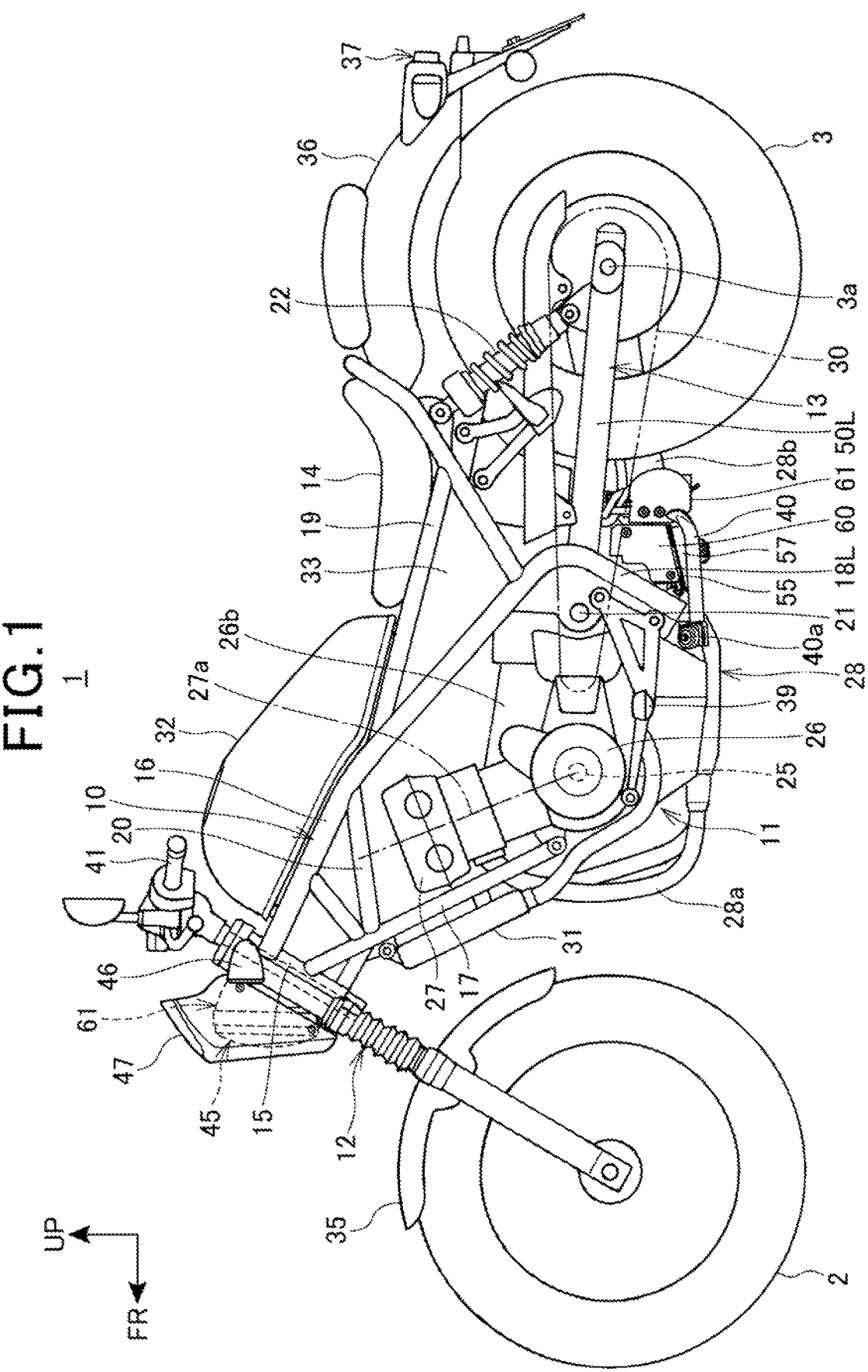
FIG. 1 is a left side view illustrating a motorcycle according to an embodiment of the present invention.

FIG. 1 is a left side view of a motorcycle 1 according to an embodiment of the present invention.

The motorcycle 1 is a vehicle in which: an engine 11 is supported by a body frame 10; a front fork 12 steerably supporting a front wheel 2 is steerably supported at a front end of the body frame 10; and swing arms 13 supporting a rear wheel 3 are placed in a rear portion of the body frame 10.

The motorcycle 1 is a saddle riding vehicle of which an occupant sits astride a seat 14, and the seat 14 is installed above the rear portion of the body frame 10.

The body frame 10 includes a head pipe 15, a pair of left and right main frames 16, a down frame 17, a pair of left and right pivot frames 18L, 18R (only the pivot frame 18L on the left side is shown), and a seat frame 19.

The head pipe 15 is mounted at the front end of the body frame 10. The left and right main frames 16 extend downward toward the rear from the head pipe 15. The down frame 17 extends downward toward the rear from below the main frames 16 on the head pipe 15. The left and right pivot frames 18L, 18R extend downward from rear ends of the main frames 16. The seat frame 19 extends rearward from rear portions of the left and right main frames 16 and upper portions of the left and right pivot frames 18L, 18R.

The body frame 10 also includes a plurality of reinforcing frames 20 that are connected between an upper portion of the down frame 17 and upper portions of the main frames 16.

The swing arms 13 are pivotally supported on a pivot shaft 21 that is supported on the left and right pivot frames 18L, 18R. The pivot shaft 21 extends horizontally in the vehicle width direction. The pivot shaft 21 is supported on front portions of the left and right pivot frames 18L, 18R. The swing arms 13 have front end portions pivotally supported by the pivot shaft 21, and thus the swing arms 13 vertically swing about the pivot shaft 21.

The rear wheel 3 is pivotally supported by a rear-wheel axle 3a that is placed in rear end portions of the swing arms 13.

The motorcycle 1 includes a pair of left and right rear suspensions 22 that are stretched between the rear end portions of the swing arms 13 and the seat frame 19.

The engine 11 is placed underneath the main frames 16 and between the down frame 17 and the pivot frames 18L, 18R in the vehicle longitudinal direction, and the engine 11 is secured to the body frame 10.

The engine 11 includes: a crankcase 26 that supports a crankshaft 25 extending horizontally in the vehicle width direction (a left-right direction); and a cylinder section 27 that extends upward from a front portion of the crankcase 26. The cylinder section 27 has a cylinder axis 27a tilted forward with respect to the vertical.

An intake device (not shown) of the engine 11 is connected to an intake port on a rear face of the cylinder section 27.

An exhaust device 28 of the engine 11 includes: an exhaust pipe 28a that is connected to an exhaust port on a front face of the cylinder section 27; and a muffler 28b that is connected to a downstream end of the exhaust pipe 28a.

The exhaust pipe 28a extends downward from the exhaust port and further extends rearward through under the engine 11. The muffler 28b is placed on the outward side of the swing arm 13 and the rear wheel 3.

A rear portion of the crankcase 26 serves as a transmission casing 26b housing a transmission. The output of the engine 11 is transferred to the rear wheel 3 through a drive chain 30 which connects between an output shaft of the transmission and the rear wheel 3. A radiator 31 is supported by the down frame 17.

A fuel tank 32 is placed above the main frames 16 between the head pipe 15 and the seat 14. An area between the seat frame 19 and the main frames 16 is covered with a side cover 33.

The front wheel 2 is covered from above with a front fender 35 which is supported by the front fork 12. The rear wheel 3 is covered from above with a rear fender 36 which is placed at the rear of the seat 14.

A rear light unit 37 is attached to a rear end portion of the rear fender 36.

A pair of left and right steps 39 on which the occupant on the seat 14 rests his/her feet is placed in front of the left and right pivot frames 18L, 18R.

A side kickstand 40, which makes contact with the ground to support the vehicle body when the motorcycle 1 is parked, is supported at a lower end portion of the pivot frame 18L on the left side. The side kickstand 40 is mounted rotatably through a support shaft 40a mounted at an upper end.

In the parked motorcycle 1, the side kickstand 40 extends downward from the support shaft 40a to make contact with the ground. The side kickstand 40 is retracted to the vehicle body side, as illustrated in FIG. 1, by being rotated about the support shaft 40a in a rearward and upward direction.

A steering handlebar 41 is mounted at an upper end of the front fork 12.

On the front fork 12, a headlight 45 and a pair of left and right front blinkers 46 are supported, and the headlight 45 is covered with a headlight cowl 47.

Figure 2:
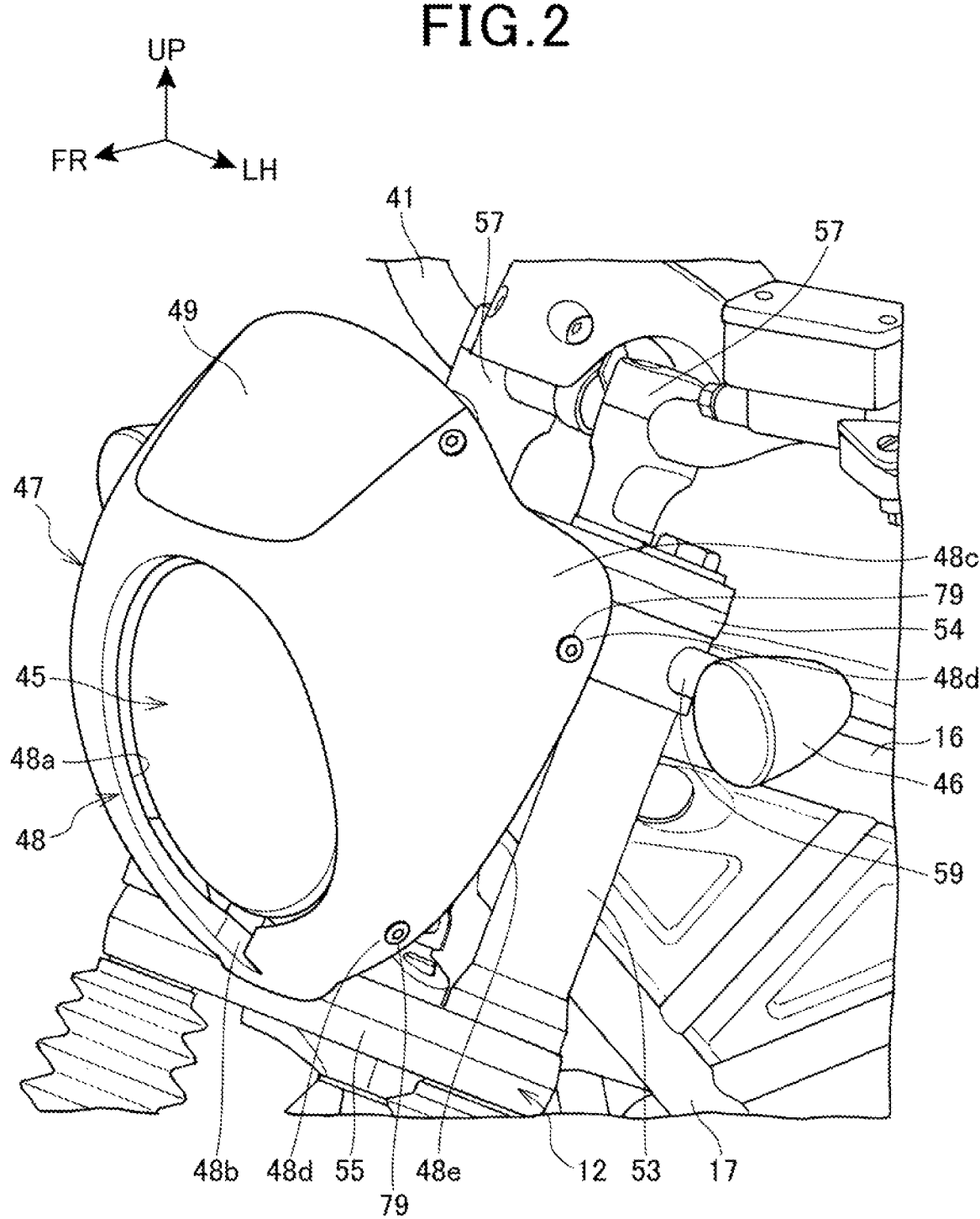
FIG. 2 is a perspective view illustrating a body front portion.
Figure 3:
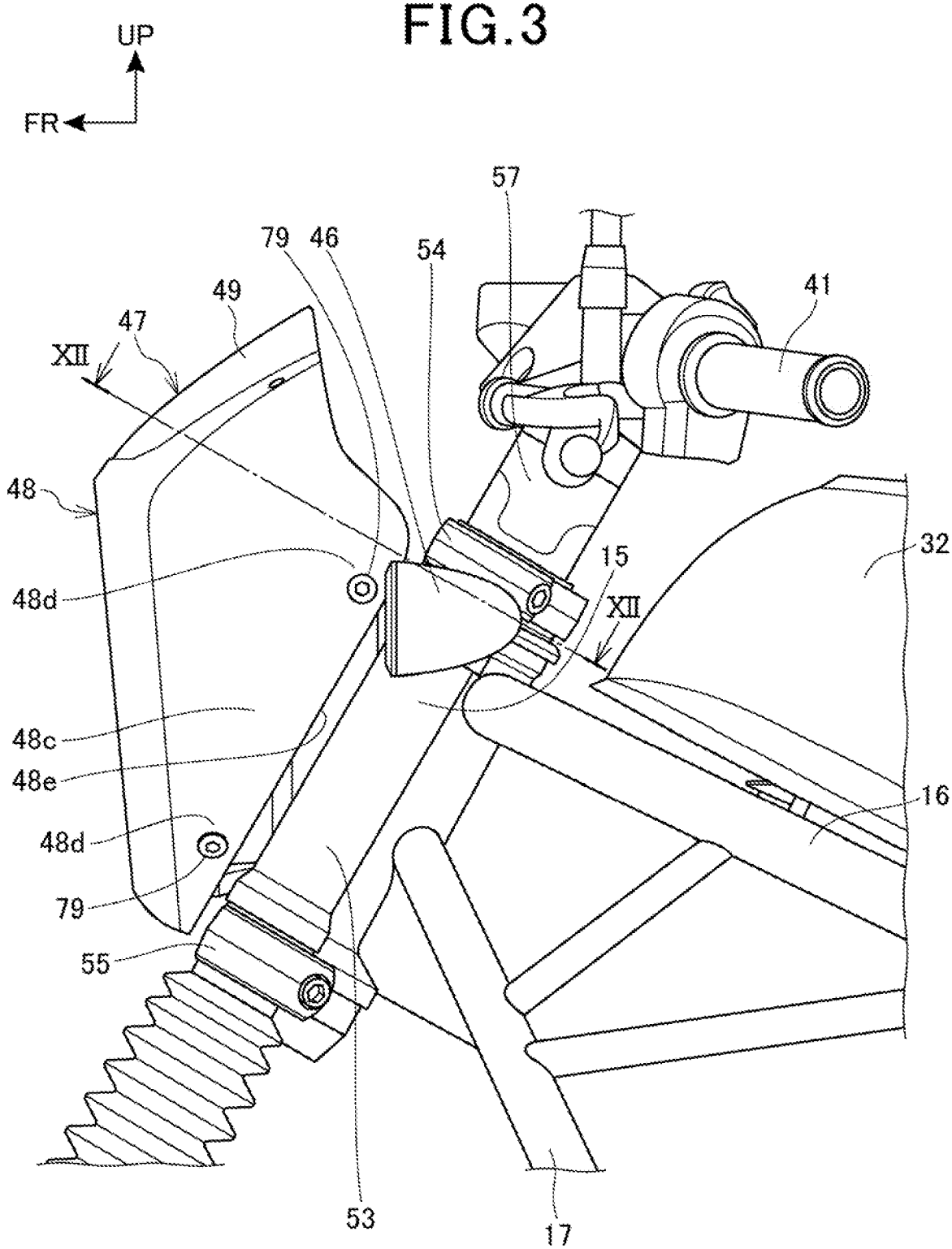
FIG. 3 is a left side view illustrating the body front portion.
Figure 4:
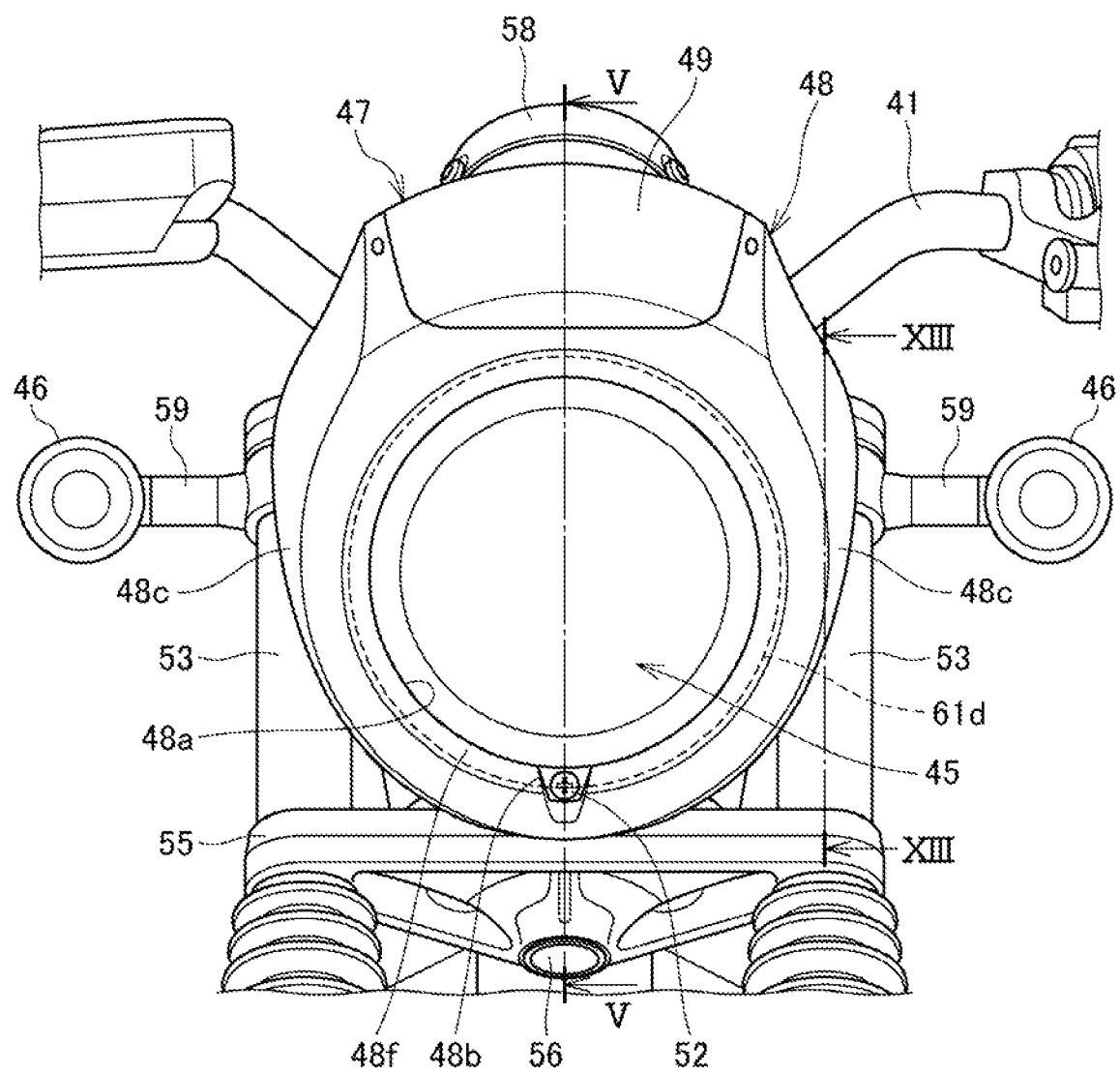
FIG. 4 is a front view illustrating the body front portion.

FIG. 2 is a perspective view illustrating a body front portion. FIG. 3 is a left side view illustrating the body front portion. FIG. 4 is a front view illustrating the body front portion.

As illustrated in FIGS. 2, 3 and 4, the periphery of the headlight 45 is covered with the headlight cowl 47.

The headlight cowl 47, which is formed into an approximately cylindrical shape, is attached to the front fork 12 side through a headlight cowl stay (not shown) so that the headlight cowl 47 is placed in front of the front fork 12. The headlight cowl 47 is formed to increase in diameter gradually from a front end toward the rear.

The headlight cowl 47 includes: a cowl body 48 including, in a front portion, a circular opening 48a in which the headlight 45 is exposed; and a windshield 49 attached to an upper portion of the cowl body 48.

As seen in the front view of the vehicle, the opening 48a is smaller than a perimeter edge of the headlight 45 (specifically, an outer peripheral face 61d (perimeter edge) of a headlight case 61 (see FIG. 5)). In other words, the outer peripheral face 61d of the headlight 45 overlaps a peripheral edge portion 48f of the opening 48a of the cowl body 48 as seen in the front view of the vehicle.

A notch 48b is formed in a lower portion of the opening 48a. Through the notch 48b, an aiming screw 52 constituting a part of an aiming mechanism 51 (see FIG. 5) that adjusts an illuminating angle of the headlight 45 is exposed at the front.

The cowl body 48 has a pair of left and right side walls 48c each of which includes a pair of upper and lower stay supports 48d which are supported by the headlight cowl stay. Each stay support 48d is perforated with a screw insertion hole (not shown) through which a screw 79 is inserted in order to fasten the headlight cowl 47 to the headlight cowl stay.

Rear edge portions 48e of the left and right side walls 48c are each formed linearly. And, as seen in the side view of the vehicle, the rear edge portions 48e are placed along front faces of a pair of left and right fork tubes 53 constituting a part of the front fork 12, and also the rear edge portions 48e are spaced forward from the fork tubes 53.

The front fork 12 includes: the left and right fork tubes 53; a top bridge 54 and a bottom bridge 55 which are arranged one above the other and are connected between the left and right fork tubes 53; and a steering stem 56 attached to the top bridge 54 and the bottom bridge 55.

The left and right fork tubes 53 are buffers and have lower end portions supporting the front wheel 2 (see FIG. 1) through an axle (not shown).

The top bridge 54 and the bottom bridge 55 each extend in the vehicle width direction, and the bottom bridge 55 is placed underneath and spaced from the top bridge 54.

The steering stem 56 is placed parallel to the left and right fork tubes 53, and is inserted into the head pipe 15 (see FIG. 1) to be rotatably supported by the head pipe 15.

To the top bridge 54, a handlebar 41 is attached through a pair of left and right handlebar holders 57.

The left and right side walls 48c of the headlight cowl 47 are located in front of the left and right fork tubes 53 as seen in the front view of the vehicle, and a lower end portion of the headlight cowl 47 is located in front of the bottom bridge 55.

Also, as seen in the front view of the vehicle, the windshield 49 extends upward beyond attachment portions of the handlebar 41 to left and right handlebar holders 57. A meter 58, which is mounted on the handlebar 41, is placed to extend upward beyond the windshield 49.

The left and right front blinkers 46 are mounted to the left and right fork tubes 53 through blinker stays 59.

Figure 5:
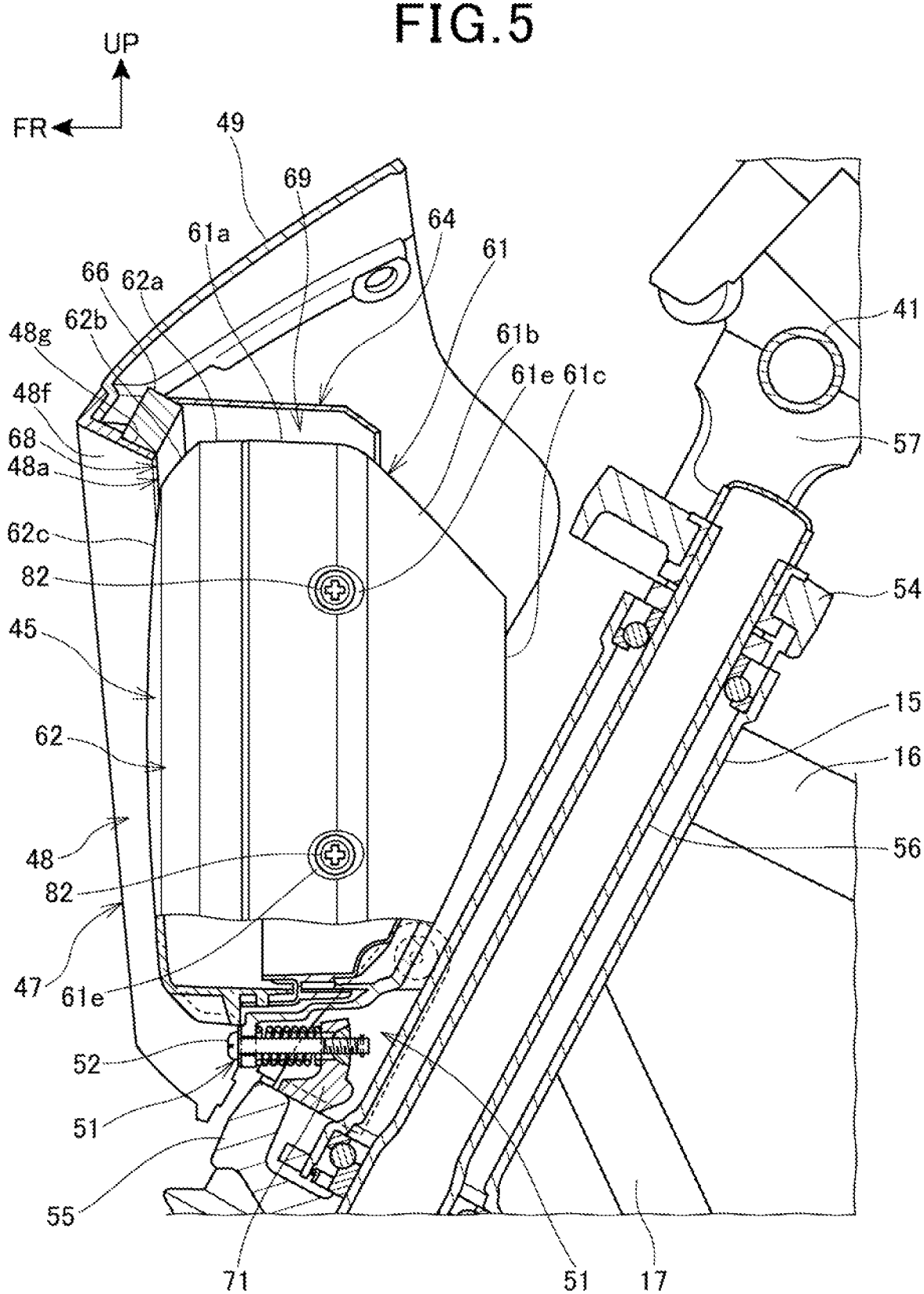
FIG. 5 is a cross-section view taken along the V-V line of FIG. 4.
Figure 6:
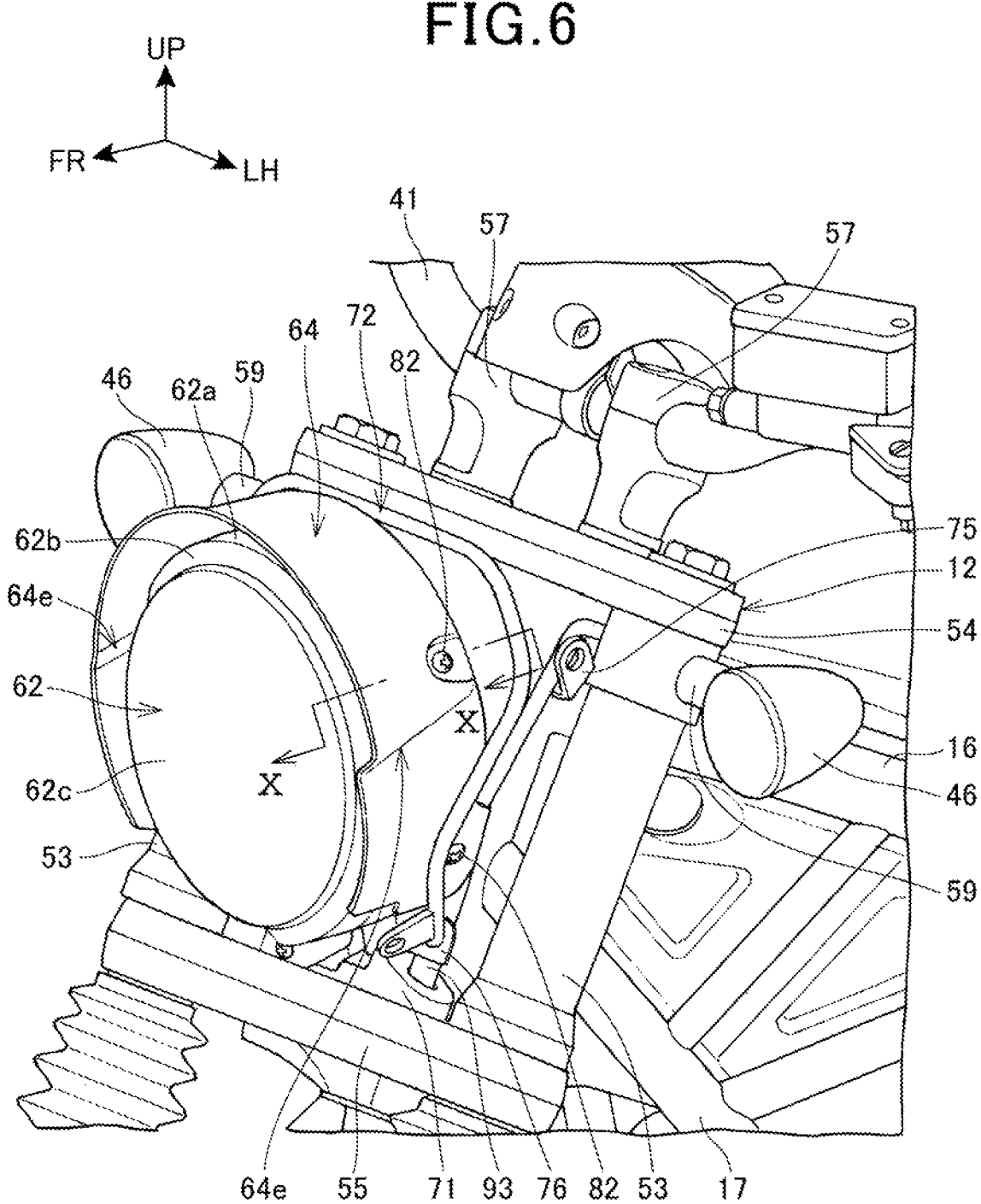
FIG. 6 is a perspective view illustrating the state where a headlight cowl is removed from the state of FIG. 2.

FIG. 5 is a cross-section view taken along the V-V line of FIG. 4. FIG. 6 is a perspective view illustrating the state where the headlight cowl 47 is removed from the state of FIG. 2.

As illustrated in FIG. 5, the headlight 45 includes a headlight case 61 and a lens 62 that is attached to the front edge of the headlight case 61.

The headlight case 61 integrally includes: a cylindrically shaped peripheral wall portion 61a adjacent to the lens 62: a rear reduced diameter portion 61b that extends while gradually decreasing in diameter from a rear edge of the peripheral wall portion 61a toward the rear; and a rear wall portion 61c that is connected to a rear edge of the rear reduced diameter portion 61b.

The lens 62 integrally includes: a cylindrically shaped lens peripheral wall portion 62a adjacent to the peripheral wall portion 61a of the headlight case 61; a front reduced diameter portion 62b that is formed into a taper shaped cylinder extending while gradually decreasing in diameter from a front edge of the lens peripheral wall portion 62a toward the front; and a front wall portion 62c connected to a front edge of the front reduced diameter portion 62b.

A headlight cover 64, which covers the outer periphery of the headlight 45, is placed between the headlight 45 and the headlight cowl 47.

The headlight cover 64 is attached to the headlight case 61. A cushion member 66 is mounted on an inner face 48g of the peripheral edge portion 48f of the cowl body 48.

The headlight cover 64 has a front edge placed into contact with the cushion member 66 in order to provide hermetical sealing between the headlight cover 64 and the cushion member 66.

As illustrated in FIG. 6, the headlight cover 64 is formed into a shape of a sideways cylinder from which a lower portion is cut out and which has an open front end and an open rear end. Because of such a shape, in FIG. 5 and FIG. 6, the lens peripheral wall portion 62a and the front reduced diameter portion 62b of the lens 62, and the peripheral wall portion 61a and the rear reduced diameter portion 61b of the headlight case 61 are each radially outwardly covered by the headlight cover 64.

The headlight cover 64 of the above-described shape blocks light illuminated from the lens peripheral wall portion 62a of the lens 62 toward the outside in the radial direction of the lens 62, so that the light is able to be prevented from leaking toward the rear side of the headlight 45.

In FIG. 5, a sponge and rubber are suitable for use as the cushion member 66 described above, and thereby the headlight cowl 47 and the headlight cover 64 can be prevented from coming into direct contact with each other to prevent occurrence of vibrations and noise.

A gap 68 is created between the opening 48a of the headlight cowl 47 and the headlight 45, and another gap 69 is created between the headlight 45 and the headlight cover 64. Because of this, traveling air flows from the opening 48a through the gaps 68, 69 toward the handlebar 41 side.

This reduces the air resistance at the body front portion, so that improved traveling stability can be achieved. And, the traveling air hits the windshield 49, and then flows rearward and obliquely upward above the handlebar 41 along the windshield 49 that is inclined upwardly toward the rear.

The headlight 45 is supported by a headlight stay 71 that is attached to the bottom bridge 55 situated underneath the headlight 45.

Also, the aiming mechanism 51 is placed underneath the headlight 45, and the aiming mechanism 51 is covered with the headlight cowl 47 from the front.

The aiming mechanism 51 is configured to include a part of the headlight stay 71.

Figure 7:
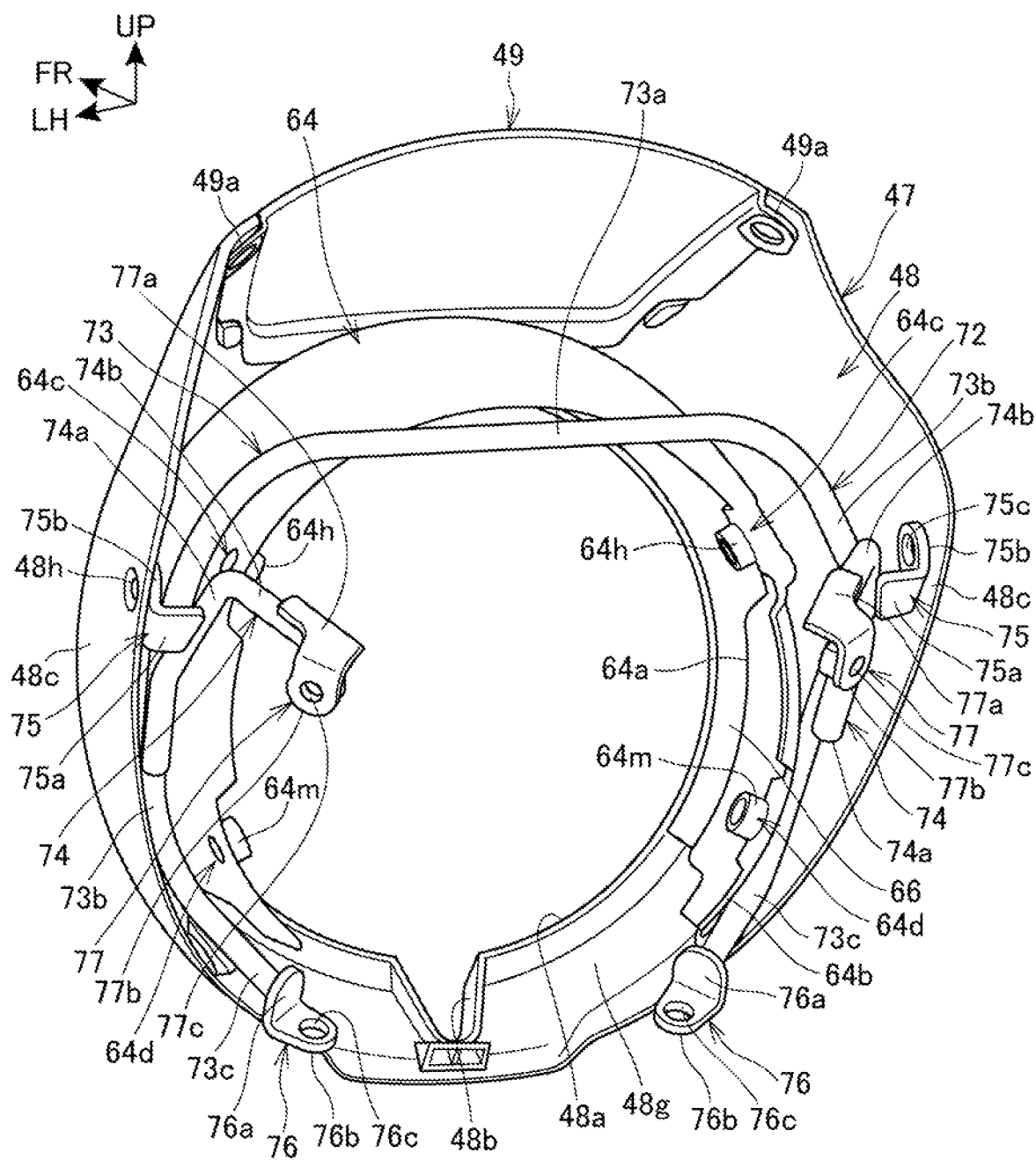
FIG. 7 is a perspective view illustrating a headlight cowl, a headlight cover and a headlight cowl stay.
Figure 8:
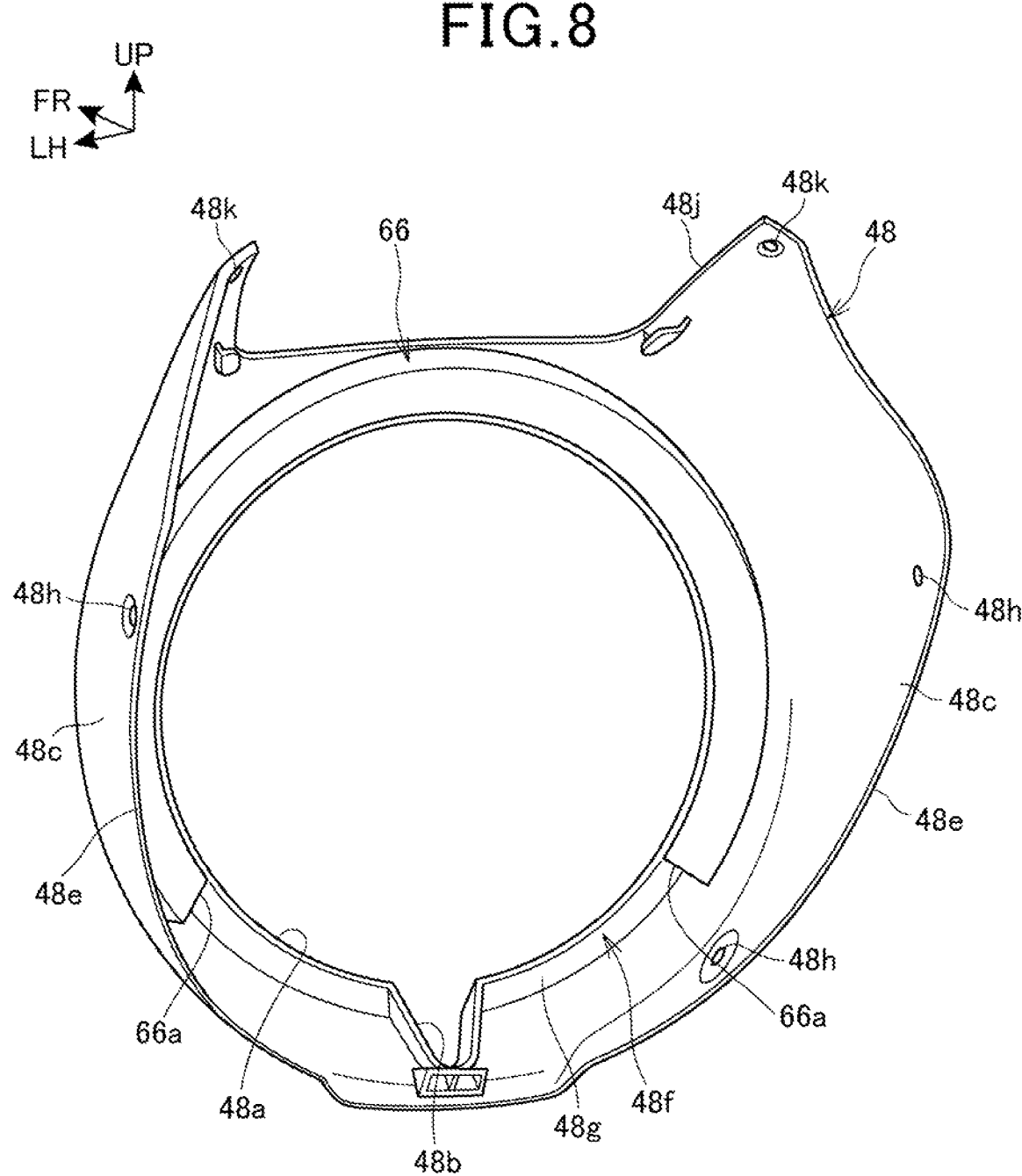
FIG. 8 is a perspective view illustrating a cowl body and a cushion member.
Figure 9:
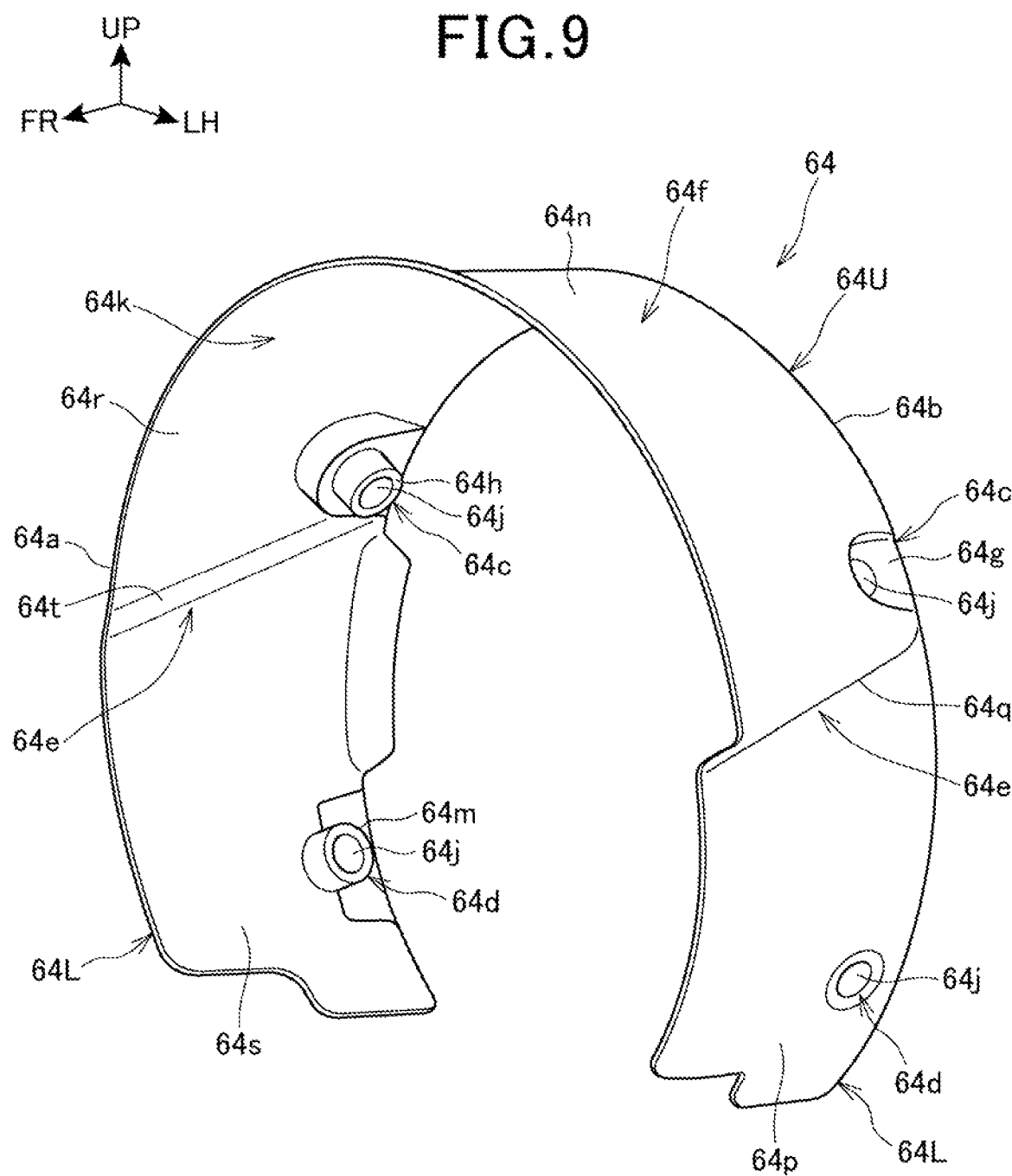
FIG. 9 is a perspective view illustrating a headlight cover.

FIG. 7 is a perspective view illustrating the headlight cowl 47, the headlight cover 64 and a headlight cowl stay 72, as viewed obliquely from the rear. FIG. 8 is a perspective view illustrating the cowl body 48 and the cushion member 66, as viewed obliquely from the rear. FIG. 9 is a perspective view illustrating the headlight cover 64 as viewed obliquely from the front.

As illustrated in FIG. 7 and FIG. 8, the cowl body 48 includes: a plurality of side screw insertion holes 48h through which screws 79 (see FIG. 3) are inserted to be fastened to the headlight cowl stay 72; an upper cutout 48j covered with the windshield 49; and a pair of left and right upper screw insertion holes 48k through which screws (not shown) are inserted to secure the windshield 49.

The screws inserted through the upper screw insertion holes 48k pass through a pair of left and right shield-side attachment portions 49a which are formed in an edge portion of the windshield 49, and then the screws are screwed into nuts (not shown).

The C-shaped plate-like cushion member 66 is affixed to the inner face 48g of the peripheral edge portion 48f of the cowl body 48. Left and right end portions 66a of the C shape of the cushion member 66 are placed at the lower end of the cushion member 66, and the front edge of the headlight cover 64 is placed in contact with the cushion member 66 in such a manner as to match the C shape of the cushion member 66.

In FIG. 7, the headlight cowl stay 72 includes a frame-shaped member 73 of an approximately C shape and a pair of left and right branch members 74. The frame-shaped member 73 is formed by bending a metal or resin made rod-shaped member, and the left and right branch members 74 extend upward along the frame-shaped member 73 from left and right portions of the frame-shaped member 73, and also extend inward and obliquely rearward in the vehicle width direction.

The frame-shaped member 73 includes: an upper portion 73a; a pair of left and right side portions 73b that extend from both ends of the upper portion 73a in a downwardly oblique outward direction and a downward direction; and a pair of left and right lower inclined portions 73c that extend inwardly oblique downward side in the vehicle width direction from lower ends of the left and right side portions 73b, respectively.

Each of the left and right branch members 74 is composed of an upward inclined extending portion 74a and an upper bend portion 74b that bends and extends from the upward inclined extending portion 74a. The upward inclined extending portion 74a extends obliquely upward along the side portion 73b from the corresponding left/right side portion 73b.

Side L-shaped attachment members 75 bending in an L shape are respectively attached to the left and right upward inclined extending portions 74a.

Each of the side L-shaped attachment members 75 is composed of an inner plate portion 75a and an outer plate portion 75b. The inner plate portion 75a is attached to the branch member 74 by welding or the like, and the inner plate portion 75a extends outward in the vehicle width direction from the branch member 74. The outer plate portion 75b bends and extends forward from an outer edge of the inner plate portion 75a.

The outer plate portion 75b is perforated with an outer plate screw insertion hole 75c through which the screw 79 (see FIG. 3) is inserted to fasten the headlight cowl 47. The headlight cowl 47 (specifically, the cowl body 48) is fastened to the outer plate portion 75b by use of the screw 79 and a nut, with the outer plate portion 75b placed in contact with the inner face 48g.

Lower L-shaped attachment members 76 bending in an L shape are respectively attached to lower end portions of the left and right lower inclined portions 73c. Each of the lower L-shaped attachment members 76 is composed of an upper plate portion 76a and a lower plate portion 76b. The upper plate portion 76a is attached to an end face of an end portion of the lower inclined portion 73c by welding or the like. The lower plate portion 76b bends in an L shape and extends from a lower edge of the upper plate portion 76b.

The lower plate portion 76b is perforated with a lower plate screw insertion hole 76c through which a bolt 88 (see FIG. 13) is inserted.

Branch attachment members 77 bending in an L shape are respectively attached to end portions of the upper bend portions 74b of the left and right branch members 74.

Each of the branch attachment members 77 is composed of: a lateral plate portion 77a that is attached to the upper bend portion 74b; and a vertical plate portion 77b that bends and extends downward from a rear edge of the lateral plate portion 77a.

The vertical plate portion 77b is perforated with a vertical plate screw insertion hole 77c through which a bolt 86 (see FIG. 13) is inserted.

As illustrated in FIG. 9, the headlight cover 64 is made of resin, and is formed into a C shape in front view by cutting out a lower portion from a cylinder gradually decreasing in diameter from a front edge 64a toward a rear edge 64b.

The headlight cover 64 includes: a pair of left and right headlight upper attachment portions 64c and a pair of left and right headlight lower attachment portions 64d all of which are formed close to the rear edge 64b; and a pair of left and right step portions 64e which are formed to extend from the front edge 64a to the rear edge 64b.

Each of the left and right headlight upper attachment portions 64c includes: a recessed portion 64g formed in an outer peripheral face 64f of the headlight cover 64; and an upper tube portion 64h extending from the bottom of the recessed portion 64g toward the inside of the headlight cover 64. The upper tube portion 64h includes a through hole 64j.

Each of the left and right headlight lower attachment portions 64d includes: a through hole 64j bored in the outer peripheral face 64f; and a lower tube portion 64m formed to protrude from an inner peripheral face 64k of the headlight cover 64.

The through hole 64j passes through the lower tube portion 64m.

The left and right step portions 64e are formed to be inclined upwardly toward the rear.

The headlight cover 64 includes an upper cover portion 64U extending upward from the step portions 64e, and a pair of left and right lower cover portions 64L extending downward from the step portions 64e.

The left and right headlight upper attachment portions 64c are mounted in the upper cover portion 64U, and the left and right headlight lower attachment portions 64d are mounted in the lower cover portions 64L.

The outer peripheral face 64f is composed of: an upper outer peripheral face 64n of the upper cover portion 64U; lower outer peripheral faces 64p of the respective left and right lower cover portions 64L; and a pair of left and right step outer peripheral faces 64q respectively connecting the upper outer peripheral face 64n and the lower outer peripheral faces 64p with each other in the left and right step portions 64e. The left and right step outer peripheral faces 64q are each oriented downward.

At least around the left and right step portions 64e, the upper outer peripheral face 64n is located radially outward of the left and right lower outer peripheral faces 64p.

The inner peripheral face 64k is composed of: an upper inner peripheral face 64r of the upper cover portion 64U; lower inner peripheral faces 64s of the respective left and right lower cover portions 64L; and a pair of left and right step inner peripheral faces 64t respectively connecting the upper inner peripheral face 64r and the lower inner peripheral faces 64s with each other in the left and right step portions 64e. The left and right step inner peripheral faces 64t are each oriented upward.

At least around the left and right step portions 64e, the upper inner peripheral face 64r is located radially outward of the left and right lower inner peripheral faces 64s.

Thus, between the headlight 45 (see FIG. 6) and the headlight cover 64, at least around the left and right step portions 64e, the gap between the headlight 45 and the upper inner peripheral face 64r is larger than the gaps between the headlight 45 and the left and right lower inner peripheral faces 64s.

Figure 10:
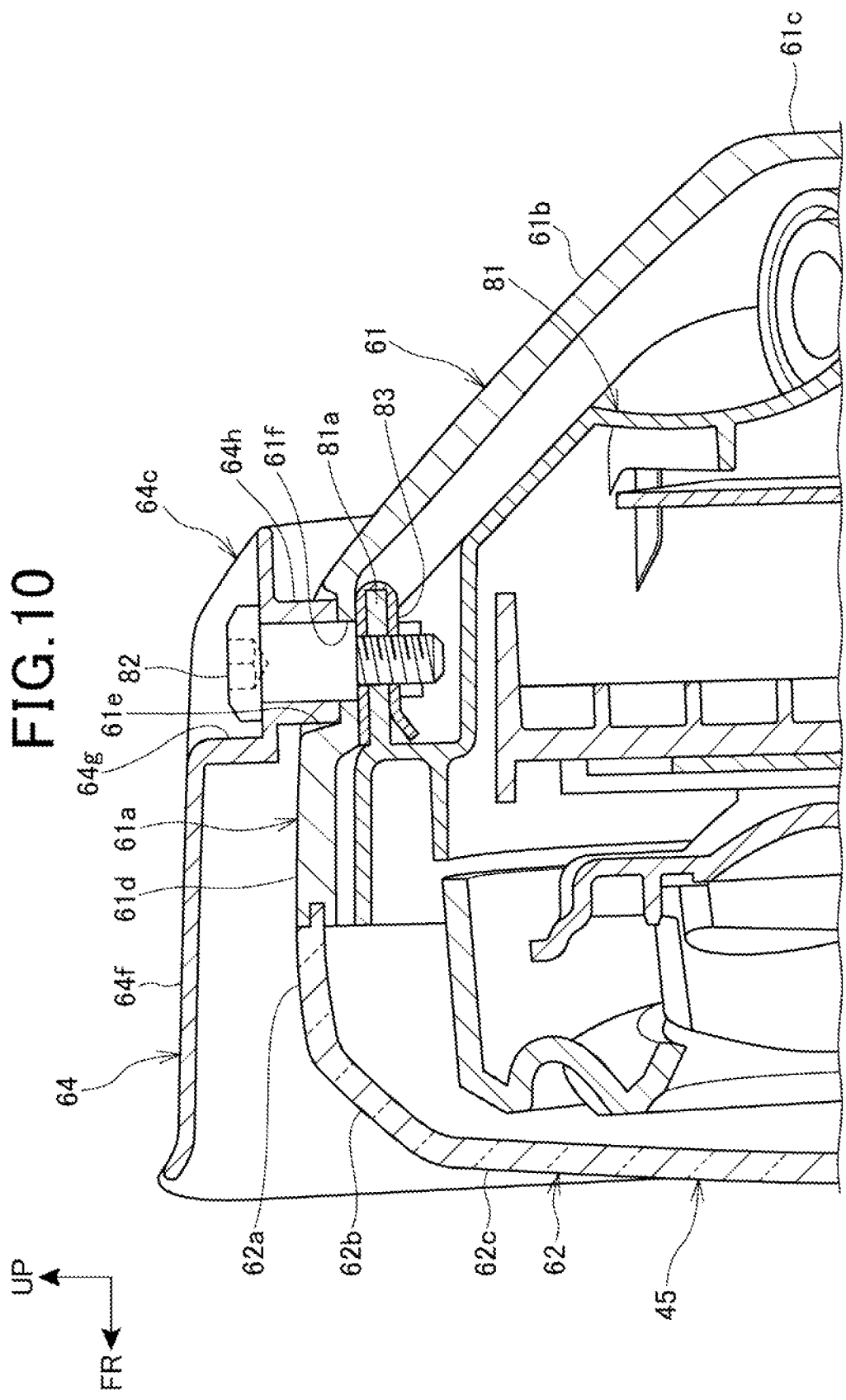
FIG. 10 is a cross-section view taken along the X-X line of FIG. 6.

FIG. 10 is a cross-section view taken along the X-X line of FIG. 6.

In the headlight 45, a housing 81 is placed within the headlight case 61 to support a reflector (not shown) and the like.

The housing 81 includes a plurality of protruding pieces 81a extending in the front-rear direction from an outer peripheral portion, and the protruding pieces 81a are attached to the peripheral wall portion 61a of the headlight case 61 with a plurality of bolts 82.

Plate nuts 83 are respectively attached to the plurality of protruding pieces 81a. A plurality of countersinks 61e and bolt insertion holes 61f bored in the bottoms of the countersinks 61e are formed in the outer peripheral face 61d of the peripheral wall portion 61a of the headlight case 61.

The upper tube portions 64 of the left and right headlight upper attachment portions 64c and the lower tube portions 64m (see FIG. 9) of the left and right headlight lower attachment portions 64d (see FIG. 9) of the headlight cover 64 are respectively inserted into the countersinks 61e, so that the headlight cover 64 is temporarily secured to the headlight case 61.

In this condition, the bolts 82 are respectively inserted from the recessed portions 64g of the headlight cover 64 through the upper tube portions 64h of the left and right headlight upper attachment portions 64c and the lower tube portions 64m of the left and right headlight lower attachment portions 64d, and also through the bolt insertion holes 61f. Then, the distal ends of the respective bolts 82 are respectively screwed into the plate nuts 83 which are mounted on the protruding pieces 81a. Thus, the headlight cover 64 is finally secured to the headlight case 61.

In this manner, the plurality of countersinks 61e are formed in the headlight case 61, and the upper tube portions 64h and the lower tube portions 64m, all of which are inserted into the countersinks 61e, are formed on the headlight cover 64, so that the headlight cover 64 can be temporarily secured to the headlight case 61. This obviates the need for the headlight cover 64 to be held with a hand when the headlight cover 64 is finally secured to the headlight case 61 with the bolts 82, and therefore the assembly efficiency can be improved.

In any vehicle which includes the headlight 45 around which the headlight cowl 47 and the headlight cover 64 are not mounted, attachment of the housing 81 to the headlight case 61 is performed by use of bolts each of which is shorter in length than the bolt 82 by a length obtained by subtracting the thickness of the bottom of each countersink 61e from the length of the upper tube portion 64h/lower tube portion 64m. On the contrary, according to the embodiment, the bolts 82, rather than the shorter bolts described above, are used to co-clamp the housing 81 and the headlight cover 64 to the headlight case 61. This obviates the need to provide an extra fastener member to secure the headlight cover 64 to the headlight case 61. This results in a reduction in component count and in turn in a reduction in cost.

Figure 11:
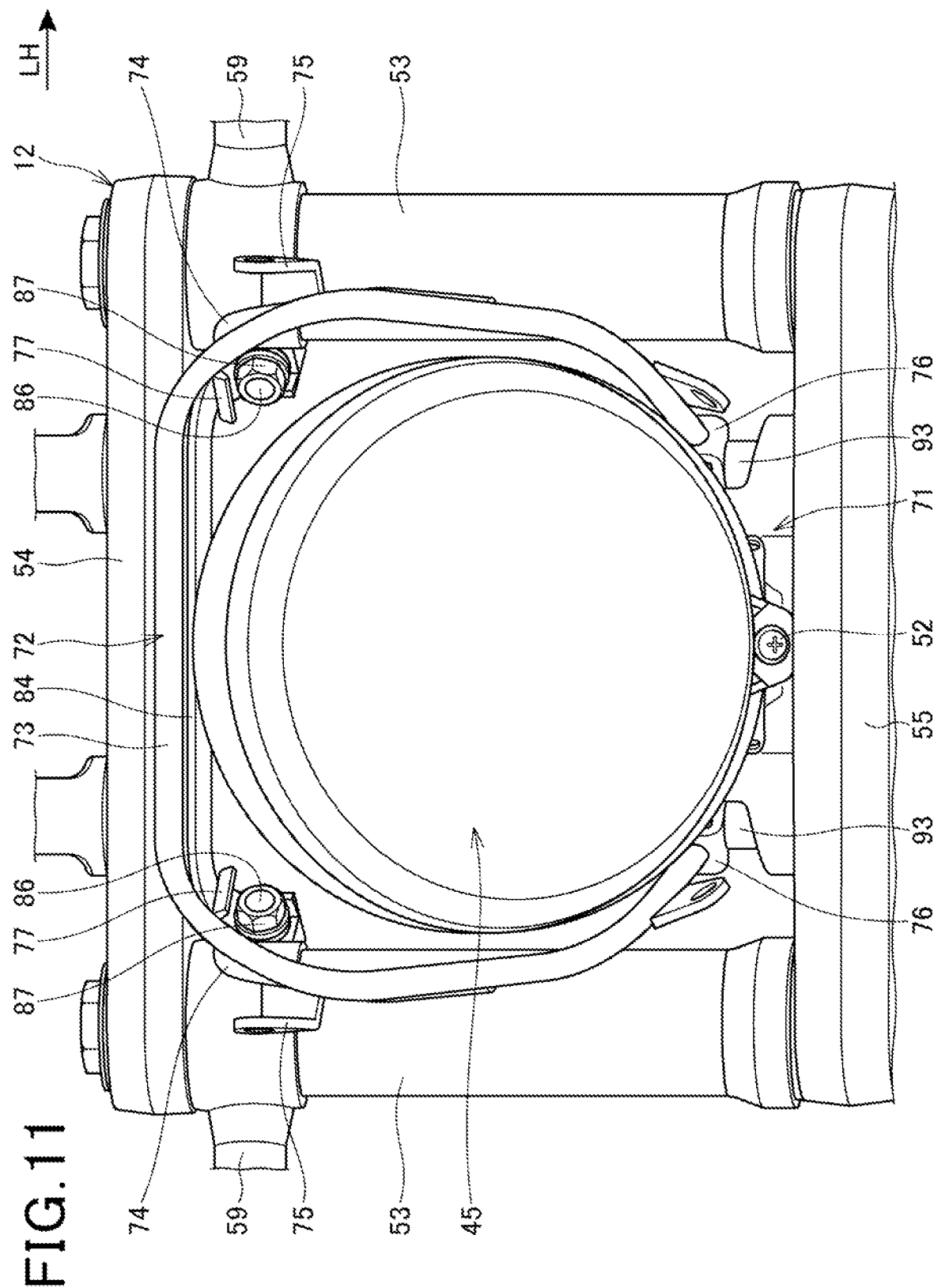
FIG. 11 is a perspective view of the body front portion when seen from front obliquely upward.

FIG. 11 is a perspective view of the body front portion when seen from front obliquely upward. It is noted that the headlight cowl 47 and the headlight cover 64 are omitted.

A cowl stay support member 84 is attached to the underside of the top bridge 54. The left and right branch attachment members 77 of the headlight stay 72 are secured to both end portions of the cowl stay support member 84 with the bolts 86 and nuts 87 that fasten the left and right blinker stays 59 to the fork tubes 53, respectively.

Figure 13:
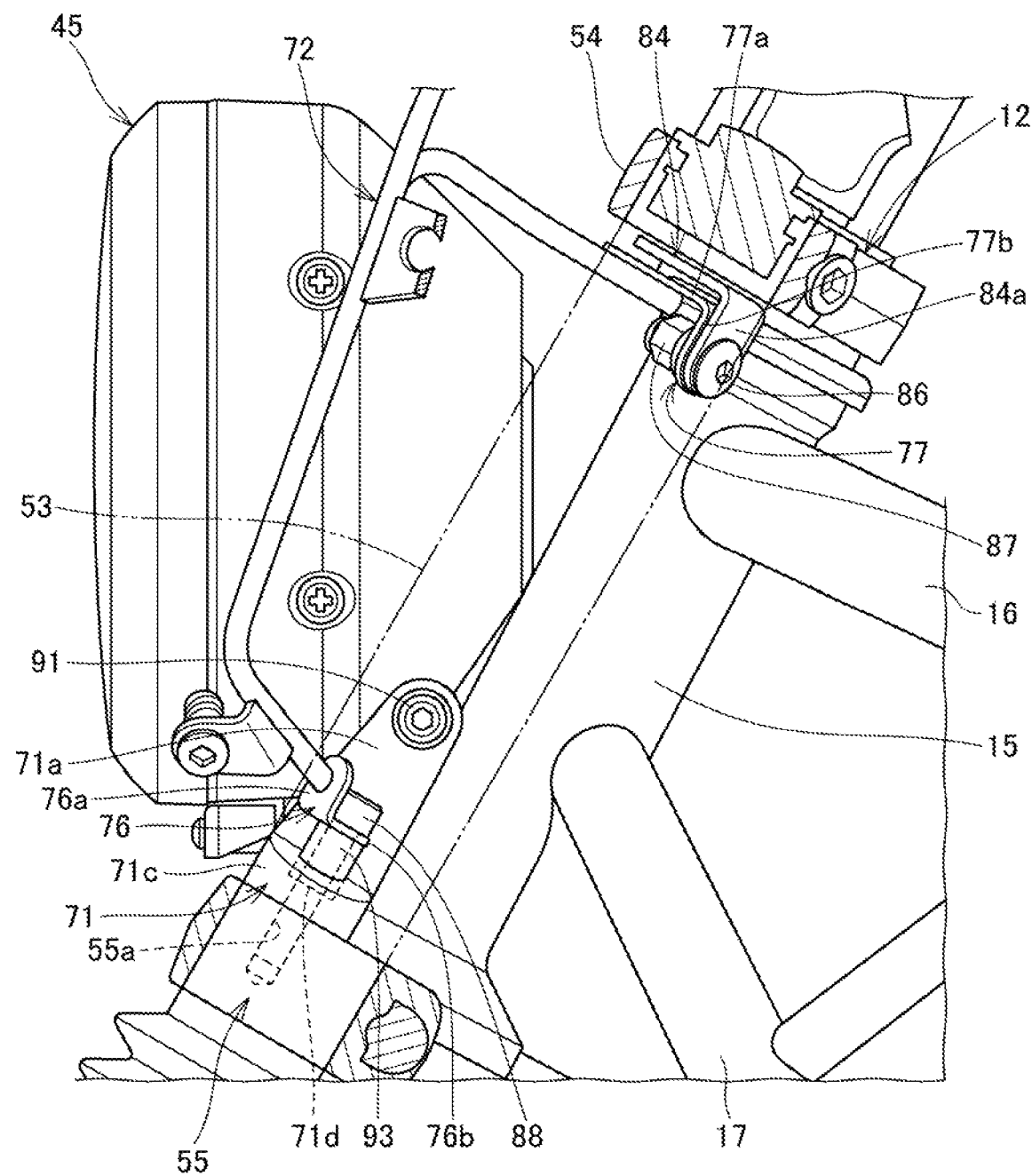
FIG. 13 is a cross-section view taken along the XIII-XIII line of FIG. 4.

Also, the left and right lower L-shaped attachment members 76 of the headlight cowl stay 72 are co-clamped to the bottom bridge 55 by the headlight stay 71 and bolts 88 (see FIG. 13).

Figure 12:
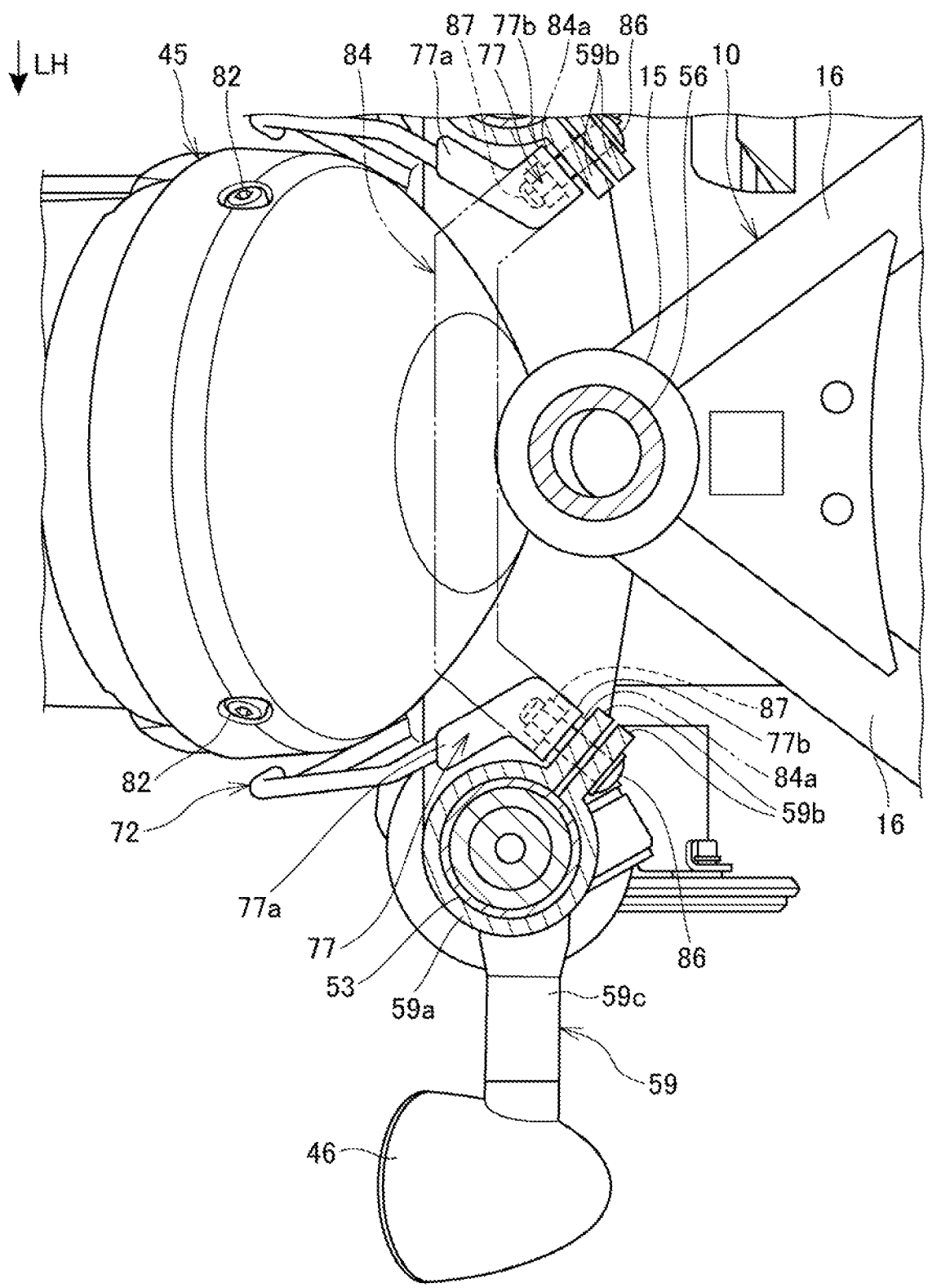
FIG. 12 is a cross-section view taken along the XII-XII line of FIG. 3.

FIG. 12 is a cross-section view taken along the XII-XII line of FIG. 3. In FIG. 12, the headlight cowl 47 and the headlight cover 64 are omitted.

The front blinkers 46 are supported on upper portions (specifically, portions close to the top bridge 54 (see FIG. 3)) of the left and right fork tubes 53 by the resin-made blinker stays 59. Each of the blinker stays 59 integrally includes a C-shaped fitting portion 59a, a pair of plate-shaped end portions 59b and a shaft portion 59c.

The C-shaped fitting portion 59a is a C-shaped portion fitted over the outer peripheral face of the left/right fork tube 53. The plate-shaped end portions 59b are provided as a pair of flat plate-shaped portions that are respectively connected to two end portions of the C-shaped fitting portion 59a and also that are clamped together by the bolt 86 and the nut 87. The shaft portion 59c extends outward in the vehicle width direction from the C-shaped fitting portion 59a so that the front blinker 46 is attached to a distal end portion of the shaft portion 59c.

The cowl stay support member 84 integrally includes downward bending portions 84a at both ends, and each downward bending portion 84a and the corresponding vertical plate portion 77b of the branch attachment member 77 of the headlight cowl stay 72 are sandwiched between one of the above-described plate-shaped end portions 59b and the nut 87. Then, the downward bending portion 84a and the vertical plate portion 77b are co-clamped together with the pair of plate-shaped end portions 59b by the bolt 86 and the nut 87.

Since the left and right blinker stays 59 are supported on the cowl stay support member 84, the cowl stay support member 84 serves as a detent which prevents the left and right blinker stays 59 from rotating relative to the respective fork tubes 53.

FIG. 13 is a cross-section view taken along the XIII-XIII line of FIG. 4. It is noted that the headlight cowl 47 and the headlight cover 64 are omitted.

Each branch attachment member 77 of the headlight cowl stay 72 is placed to underlie the downward bending portion 84a of the cowl stay support member 84, and the vertical plate portion 77b of the branch attachment member 77 and the downward bending portion 84a are clamped together with the pair of plate-shaped end portions 59b by the bolt 86 and the nut 87.

The headlight stay 71 integrally includes: a pair of left and right upward extending portions 71a extending upward; a connection portion (not shown) connecting the left and right upward extending portions 71a with each other; and a pair of left and right laterally protruding portions 71c protruding respectively toward sides from lower portions of the left and right upward extending portions 71a. A pair of left and right headlight support bolts 91, which support the headlight 45 in a swingable manner, is attached to upper end portions of the left and right upward extending portions 71a.

A countersink 71d is formed in an upper face of each of the left and right laterally protruding portions 71c. A cylindrically-shaped collar 93 is mounted on the countersink 71d, and in turn the lower L-shaped attachment member 76 of the headlight cowl stay 72 is mounted on the collar 93. Then, a bolt 88 passes through the lower L-shaped attachment member 76 (specifically, the lower plate portion 76b), the collar 93 and the laterally protruding portion 71c so that the bolt 88 is screwed into a female thread 55a formed in the bottom bridge 55. In this manner, the lower L-shaped attachment member 76 is co-clamped to the headlight stay 71 and the bottom bridge 55.

As illustrated above in FIG. 5, the motorcycle 1 as a saddle riding vehicle includes, in the body front portion: the headlight 45 that includes the headlight case 61 and the lens 62 coupled to the front end of the headlight case 61; and the headlight cowl 47 covering the periphery of the headlight 45.

In the body front structure of the motorcycle 1, the lens 62 includes the lens peripheral wall portion 62a as a cylindrically-shaped peripheral wall portion coupled to the headlight case 61, and the headlight cover 64 as a cylindrically-shaped cover member which gradually decreases in diameter toward the rear of the vehicle is placed between the headlight 45 and the headlight cowl 47. The headlight cover 64 covers at least the outside of the lens peripheral wall portion 62a of the lens 62.

With the configuration, the lens peripheral wall portion 62a of the lens 62 is covered with the cylindrically-shaped headlight cover 64 which gradually decreases in diameter toward the rear of the vehicle. Because of this, blocking of the light illuminated from the peripheral wall portion 62a of the lens 62 is achieved by a simple structure, so that the light is able to be prevented from leaking toward the rear of the vehicle.

Also, as illustrated in FIG. 5 and FIG. 10, the headlight cover 64 is attached to the headlight 45 (specifically, the headlight case 61 and the housing 81), and the front end of the headlight cover 64 abuts on the cushion member 66 mounted on the inner face of the headlight cowl 47.

With the configuration, since the leakage of light is prevented by the headlight cover 64 that is independent of the headlight 45 and the headlight cowl 47, the shape is not complicated as done where the leakage of light is prevented by the headlight 45 (e.g., the headlight case 61) and the headlight cowl 47. Therefore, the attachment of the headlight cover 64 to the headlight 45 can be facilitated to enhance working efficiency. Also, in the embodiment, since the headlight cover 64 is co-clamped to a fastening portion of the headlight case 61 and the housing 81, there is no need to provide an additional attachment portion in the headlight cover 64.

Also, as illustrated in FIG. 9 and FIG. 10, the plurality of countersinks 61e is formed in the peripheral wall portion 61a of the headlight case 61, and the upper tube portions 64h and the lower tube portions 64m as a plurality of tube portions protruding inward from the inner face are formed on the headlight cover 64 to be respectively fitted into the countersinks 61e. And, the bolts 82 as fastener members inserted through the upper tube portions 64h and the lower tube portions 64m pass through the headlight case 61 to be fastened to the housing 81 placed within the headlight case 61.

With the configuration, since the final assembly can be performed after the temporary assembly in which the upper tube portions 64h and the lower tube portions 64m of the headlight cover 64 are fitted into the countersinks 61e, the assembly working efficiency for the headlight cover 64 can be enhanced.

Also, as illustrated in FIG. 4 and FIG. 9, the headlight cowl 47 includes the opening 48a in which the front face of the lens 62 is exposed. The opening 48a is formed smaller than the outer peripheral face (perimeter edge) of the headlight case 61, so that, as seen in the front view of the vehicle, the peripheral edge portion 48f as an edge portion of the opening 48a overlaps the outer peripheral face 61d of the headlight case 61. The headlight cover 64 includes the step portions 64e inside thereof, the step portions 64e being inclined upwardly from the front toward the rear.

With the configuration, traveling air, which has flown into the headlight cowl 47 through the opening 48a, smoothly flows through the space which is provided between the headlight 45 and the headlight cover 64 by the step portions 64e. Because of this, a greater effect of guiding air can be achieved to enhance the stability in handling.

Also, as illustrated in FIGS. 7, 10 and 13, the headlight cowl 47 is supported by the headlight cowl stay 72. The headlight cowl stay 72 includes the branch attachment member 77 as an upper attachment portion, and the lower L-shaped attachment member 76 as a lower attachment portion. The branch attachment member 77 is co-clamped together with the blinker stay 59 supporting the front blinker 46, and the lower L-shaped attachment member 76 is co-clamped together with the headlight stay 71 supporting the headlight 45.

With the configuration, by individually co-clamping the branch attachment member 77 and the lower L-shaped attachment member 76, it is made possible to reduce the component count and suppress resonance in the headlight cowl 47.

Also, as illustrated in FIG. 11 and FIG. 12, the left and right of the upper end portion of the front fork 12 supporting the front wheel 2 are coupled to each other by the top bridge 54. The cowl stay support member 84 supporting the headlight cowl stay 72 is attached to the top bridge 54. The cowl stay support member 84 is co-clamped together with the branch attachment member 77 and the blinker stay 59.

With the configuration, the headlight cowl stay 72 is firmly supported by the cowl stay support member 84, and also the co-clamped portion of the branch attachment member 77 and the blinker stay 59 can be utilized to support the headlight cowl stay 72. This enables a reduction in component count.

It should be understood that the embodiments set forth above are provided merely as an aspect of the present invention, and any modification and any application are possible without departing from the spirit and scope of the present invention.

Also, the present invention is not limited to the application to the motorcycle 1 and may be applicable to other saddle riding vehicles in addition to the motorcycle 1. It should be understood that the saddle riding vehicles include general vehicles in which a rider is astride the vehicle body.

REFERENCE SIGNS LIST

1 . . . Motorcycle (saddle riding vehicle)
2 . . . Front wheel
12 . . . Front fork
45 . . . Headlight
46 . . . Front blinker
47 . . . Headlight cowl
48a . . . Opening
48f . . . Peripheral edge portion (edge portion) of opening 48a
54 . . . Top bridge
59 . . . Blinker stay
61 . . . Headlight case
61d . . . Outer peripheral face (perimeter edge) of peripheral wall portion
61e . . . Countersink
62 . . . Lens
62a . . . Lens peripheral wall portion (peripheral wall portion)
64 . . . Headlight cover (cover member)
64e . . . Step portion
64h . . . Upper tube portion (tube portion)
64m . . . Lower tube portion (tube portion)
66 . . . Cushion member
71 . . . Headlight stay
72 . . . Headlight cowl stay
76 . . . Lower L-shaped attachment member (lower attachment portion)
77 . . . Branch attachment member (upper attachment portion)
81 . . . Housing
82 . . . Bolt (fastener member)
84 . . . Cowl stay support member

The invention claimed is:

1. A front structure of a saddle riding vehicle, comprising, in a body front portion:
a headlight that includes a headlight case and a lens coupled to a front end of the headlight case; and
a headlight cowl that covers a periphery of the headlight,
wherein the lens includes a peripheral wall portion that is formed in a cylindrical shape and that is coupled to the headlight case,
a cover member of a cylindrical shape is arranged between the headlight and the headlight cowl, the cover member gradually decreasing in diameter toward rear of the vehicle,
the cover member covers at least outside of the peripheral wall portion of the lens,
the headlight case has a peripheral wall portion in which a plurality of countersinks is formed, the cover member has a plurality of tube portions that protrudes toward an inside from an inner face and that is formed to be respectively fitted into the plurality of countersinks, and a fastener member is inserted through each of the plurality of tube portions and then passes through the headlight case to be fastened to a housing placed inside the headlight case.

2. The front structure of the saddle riding vehicle according to claim 1, wherein the headlight cowl is supported by a headlight cowl stay including an upper attachment portion and a lower attachment portion, the upper attachment portion is co-clamped together with a blinker stay supporting a front blinker, and the lower attachment portion is co-clamped together with a headlight stay supporting the headlight.

3. The front structure of the saddle riding vehicle according to claim 2, wherein left and right sides of an upper end portion of a front fork supporting a front wheel is connected through a top bridge, a cowl stay support member supporting the headlight cowl stay is attached to the top bridge, and the cowl stay support member is co-clamped together with the upper attachment portion and the blinker stay.

4. The front structure of the saddle riding vehicle according to claim 1, wherein the cover member is attached to the headlight, and the cover member has a front end abutting on a cushion member mounted on an inner face of the headlight cowl.

5. The front structure of the saddle riding vehicle according to claim 1, wherein the headlight cowl includes an opening which exposes a front face of the lens, the opening is formed smaller than a perimeter edge of the headlight case, an edge portion of the opening overlaps a perimeter edge of the headlight case as seen in the front view of the vehicle, and the cover member includes a step portion inclined upwardly from the front end toward the rear.

6. A front structure of a saddle riding vehicle, comprising, in a body front portion:
- a headlight that includes a headlight case and a lens coupled to a front end of the headlight case; and
- a headlight cowl that covers a periphery of the headlight,
- wherein the lens includes a peripheral wall portion that is formed in a cylindrical shape and that is coupled to the headlight case,
- a cover member of a cylindrical shape is arranged between the headlight and the headlight cowl, the cover member gradually decreasing in diameter toward rear of the vehicle,
- the cover member covers at least outside of the peripheral wall portion of the lens,
- wherein the headlight cowl includes an opening which exposes a front face of the lens, the opening is formed smaller than a perimeter edge of the headlight case, an edge portion of the opening overlaps a perimeter edge of the headlight case as seen in the front view of the vehicle, and the cover member includes a step portion inclined upwardly from the front end toward the rear.

* * * * *